(12) United States Patent
Kupnicki

(10) Patent No.: US 6,191,821 B1
(45) Date of Patent: Feb. 20, 2001

(54) METHOD AND APPARATUS FOR SYNCHRONIZATION OF PERIODIC SIGNALS

(75) Inventor: Richard A. Kupnicki, Markham (CA)

(73) Assignee: Leitch Technology Corporation, Toronto (CA)

(*) Notice: Under 35 U.S.C. 154(b), the term of this patent shall be extended for 0 days.

(21) Appl. No.: 09/086,608

(22) Filed: May 29, 1998

(51) Int. Cl.[7] .................................................. H04N 9/475
(52) U.S. Cl. ........................................ 348/512; 348/518
(58) Field of Search ..................................... 348/512, 500, 348/518, 510, 501, 722, 495; 375/354, 362, 365, 371, 373; 327/141, 142, 145, 151, 160, 161, 162, 163

(56) References Cited

U.S. PATENT DOCUMENTS

| | | | |
|---|---|---|---|
| 3,950,780 | | 4/1976 | Freestone ............................. 358/28 |
| 4,344,083 | | 8/1982 | Srivastava .......................... 358/21 V |
| 4,626,914 | | 12/1986 | Breimer .............................. 358/148 |
| 4,646,151 | | 2/1987 | Welles, II et al. ................... 358/149 |
| 4,709,347 | | 11/1987 | Kirk .................................... 364/900 |
| 4,885,638 | * | 12/1989 | Bennett ............................... 348/518 |
| 5,045,942 | | 9/1991 | Tsugane et al. .................... 358/148 |
| 5,243,425 | * | 9/1993 | Thompson .......................... 348/500 |
| 5,262,861 | * | 11/1993 | Herz .................................... 348/500 |
| 5,274,450 | | 12/1993 | Elberbaum .......................... 358/149 |
| 5,283,649 | | 2/1994 | Elderbaum et al. ................ 348/500 |
| 5,535,251 | | 7/1996 | Sugawara ............................ 375/356 |
| 5,625,651 | * | 4/1997 | Cioffi .................................. 375/354 |
| 5,642,285 | | 6/1997 | Woo et al. .......................... 364/449.7 |
| 5,729,550 | * | 3/1998 | Nakajima et al. .................. 371/501 |
| 5,818,539 | * | 10/1998 | Naimpally et al. ................. 348/512 |
| 5,946,049 | * | 8/1999 | Cooper et al. ...................... 348/513 |
| 5,982,828 | * | 11/1999 | Fujimori et al. .................... 375/356 |

\* cited by examiner

Primary Examiner—Victor R. Kostak
(74) Attorney, Agent, or Firm—Dimock Stratton Clarizio; Mark B. Eisen

(57) ABSTRACT

A method and apparatus for synchronizing unrelated reference signals originating from two or more sources at different locations, which signals may be in different signal formats and/or subject to different delays at the receiving station. A master generator having an absolute time input from a highly stable time source generates a master reference signal having a frequency that is a common multiple of the frequencies of the unrelated reference signals. A counter is implemented from an arbitrary initial time point and the time elapsed from the initial time point to a synchronizing event is periodically encoded into the master reference signal as time code data. A slave generator associated with each information signal is genlocked to the master reference signal, and the time code data is encoded into the slave reference outputs. Each synchronizing event is thus associated with time code data specifying the absolute time of the synchronizing event, which can be inserted into an upstream position in the slave reference output associated with the information signal. Thus, two signals originating from different locations can be precisely synchronized so that transmission from one source to the other is synchronous and signal timings are known in advance.

7 Claims, 5 Drawing Sheets

METHOD AND APPARATUS FOR SYNCHRONIZATION OF PERIODIC SIGNALS

FIELD OF INVENTION

This invention relates to the processing of signals. In particular, this invention relates to a method and apparatus for synchronizing unrelated reference signals associated with information signals originating from two or more sources at different locations and/or in different formats.

BACKGROUND OF THE INVENTION

Composite and component video and audio equipment frequently utilizes an external reference signal for synchronization. The use of a reference signal is particularly important in the case of digital video and audio signals, where the reference signal serves to avoid buffer management problems, manage jitter and maintain a defined relationship between video and audio signals.

A reference signal is produced by a sync generator which contains a crystal-controlled highly stable oscillator that generates a signal of the same frequency as an information signal, for example a video or audio signal, but with precise timing signals that are not subject to frequency drift or time base errors which might affect the information signal. For example, in the case of a colour video signal the sync generator generates horizontal sync, vertical sync, colour reference, burst flag and blanking pulses, typically as a colour black reference signal, at precise intervals corresponding to the nominal specifications for the format of the particular signal being processed. North American colour television signals conform to the NTSC standard with a colour subcarrier frequency of 3.579545 MHz to produce 60 fields per second, or 30 frames of 525 interlaced horizontal lines per frame, while most European colour television signals conform to the PAL standard with a colour subcarrier frequency of 4.43361875 MHz to produce 50 fields per second, or 25 frames of 625 interlaced horizontal lines per frame.

There are many situations in which signals from sources at different locations must be integrated or combined, for example a video signal and its associated audio signal, where for example an NTSC video signal received from a satellite feed or microwave repeater relay network may have its associated audio signal transmitted to the broadcast facility over land lines. In other cases a remote video feed may be integrated with a local video signal, for example in a news broadcast or a live interview between the broadcast facility and a remote location.

In a typical broadcast facility video signals originating from within the broadcast facility are genlocked to the reference signal generated by a master generator, which provides a common timing reference for aligning the various signals, as is well known. Frame synchronizers compare the timing of sync, burst flag etc. pulses in the reference signal with the timing of corresponding pulses in the various video signals, and where a timing difference exceeds a preselected tolerance the frame synchronizer either repeats a frame or drops a frame to compensate for the phase offset of the information signal.

However, a problem arises when it becomes necessary to combine information signals originating from sources at different locations. The lengths of the signal paths may differ, for example where a video signal is relayed via satellite and its associated audio signal is transmitted over land lines, which causes a delay differential between the signals, or independent video signals containing information relating to a common event, for example a local interviewer interviewing a person at remote location, or a panel discussion between panelists in different cities, will arrive at the broadcast facility at different times if the signal paths differ. Each remote signal source may be locked to an independent reference signal, which may not be in precise alignment with other unrelated reference signals or the reference signal used by the broadcast facility.

Additional problems arise in the case of signals having different formats, for example an NTSC video signal and a PAL video signal. Video signals must be in the same format in order to be combined or integrated into a single broadcast, and the conversion of one signal to the format of another signal causes a delay in the converted signal which results in, or exacerbates, a delay differential between the signals, and the reference signals associated with these video signals are incompatible with one another.

Devices for synchronizing frames between signals having the same format, for example two NTSC video signals, are known. However such devices operate by aligning frame boundaries, ie. aligning line 1, field 1 of one video signal with line 1, field 1 of another video signal in the same format, or aligning signals to a reference signal, to the nearest frame boundary. This is a much more complex problem in the case of signals having different formats. Moreover, frequently the extent of the delay differential between signals originating from different locations extends to many frames, and there has heretofore been no satisfactory method for aligning such signals by information content.

Using conventional methods signals from sources at different locations can often be frame-aligned, but human intervention (largely reliant upon the experience of skilled technicians and a considerable amount of guesswork) has been necessary to content-align multiple signals. Thus, a video signal and its associated audio signal must be aligned to avoid so-called"lip-sync" errors, or two video signals which contain related information such as an interactive conversation between persons at disparate locations must be aligned so that the resulting integration appears to flow without unnatural pauses or delays.

SUMMARY OF THE INVENTION

The invention provides a method and apparatus for aligning unrelated reference signals originating from two or more sources at different locations and/or in different signal formats, which reference signals may be subject to different delays at the receiving station. According to the invention, an arbitrary point in time is selected as an initial time point (t=0) and all unrelated reference signals clock edges and phase relationships are deemed to be in alignment or at a"zero point" as at the initial time point. All synchronizing signals are thus aligned to a defined and standardized starting point.

A master generator having an absolute time input from a highly stable time source, for example an atomic clock or the Global Positioning System (GPS), generates a master reference signal. A time counter, which may be resolved to the order of picoseconds, is implemented from the initial time point and the time elapsed from the initial time point is periodically encoded into the master reference signal as time code data, for example multiple bit words consisting of an integer part that denotes the number of seconds and a fractional part that denotes the number of fractional seconds that have elapsed since the initial time point.

A slave generator associated with each information signal is genlocked to the master reference signal, and the time code data is encoded into the slave reference outputs. The various information signals are locked to their respective slave reference outputs. Each synchronizing event is associated with time code data specifying the absolute time (relative to the initial time point) of the synchronizing event, which is inserted into an upstream position in the slave reference output of the affected information signal, for example in the case of an NTSC or PAL video signal, into the vertical blanking interval of the previous frame.

Multiplying the frequency of each signal by the time elapsed between the initial time point and any later point in time provides the number of cycles and partial cycles of each signal that have been generated up to the later point in time, and thus the relative position of each signal at the later point in time. Two signals can thus be aligned by delaying one of the signals according to a delay constant representing the phase offset of the signal as encoded into the previous frame of its associated slave reference signal. Thus, according to the invention signal timings are detected in advance of the synchronizing event. The invention can be applied to synchronize reference signals in all formats, including NTSC, PAL, AES, MPEG-2, Timecode, Time of Day, ATSC, and HDTV.

In this fashion, for example, two television studios in different locations could be precisely synchronized using a GPS system, so that transmission from one to the other would be synchronous and signal timings would be known in advance.

The present invention thus provides a method of synchronizing one or more unrelated reference signals, comprising the steps of (a) implementing a counter to generate time code data representing time elapsed from an initial time point, (b) encoding the time code data into the reference signals, (c) calculating phase angles of the reference signals at a later point in time relative to phase angles of the reference signals at the initial time point based on time elapsed since the initial time point, and (d) delaying one or more of the reference signals to compensate for any phase offset calculated in step (c).

The present invention further provides an apparatus for synchronizing one or more unrelated reference signals, comprising a master sync generator adapted to accept an absolute time reference as an input, comprising a counter for counting elapsed time from an initial time point and encoding a value representing said elapsed time into a master reference signal output by the master sync generator, and a plurality of slave sync generators each adapted to accept the master reference signal as an input, comprising calculation software for calculating relative phase angles of the unrelated reference signals at a later point in time based on time elapsed since the initial time point and generating an slave reference signal into which said time elapsed value is encoded.

The present invention further provides a system for synchronizing one or more unrelated timing signals, comprising a master sync generator programmed with an initial reference time to function as absolute time reference, comprising software for calculating relative phase angles of the unrelated reference signals at a later point in time based on elapsed time from the absolute time reference and generating time code data representing said elapsed time, master sync generator being adapted to generate an output signal in which said time code data is encoded, and a slave synchronizing generator for receiving the output signal from the master sync generator, comprising software for decoding the encoded time code data to synchronize said one or more unrelated timing signals.

BRIEF DESCRIPTION OF THE DRAWINGS

In drawings which illustrate by way of example only a preferred embodiment of the invention.

DETAILED DESCRIPTION OF THE INVENTION

The present invention provides a method and apparatus for synchronizing reference signals, and thereby aligning information signals associated with the reference signals. The signals may be in different formats and/or may originate from different locations. As used herein an"information signal" includes any signal which contains information in analog or digital form, for example currently standard video signals such as NTSC, PAL, MPEG-2, ATSC and HDTV, and audio signals such as AES digital audio. The invention can be implemented in any case where information signals are to be aligned for superposition, combination, integration, etc. by a broadcasting facility, editing facility or the like.

Figure 1:
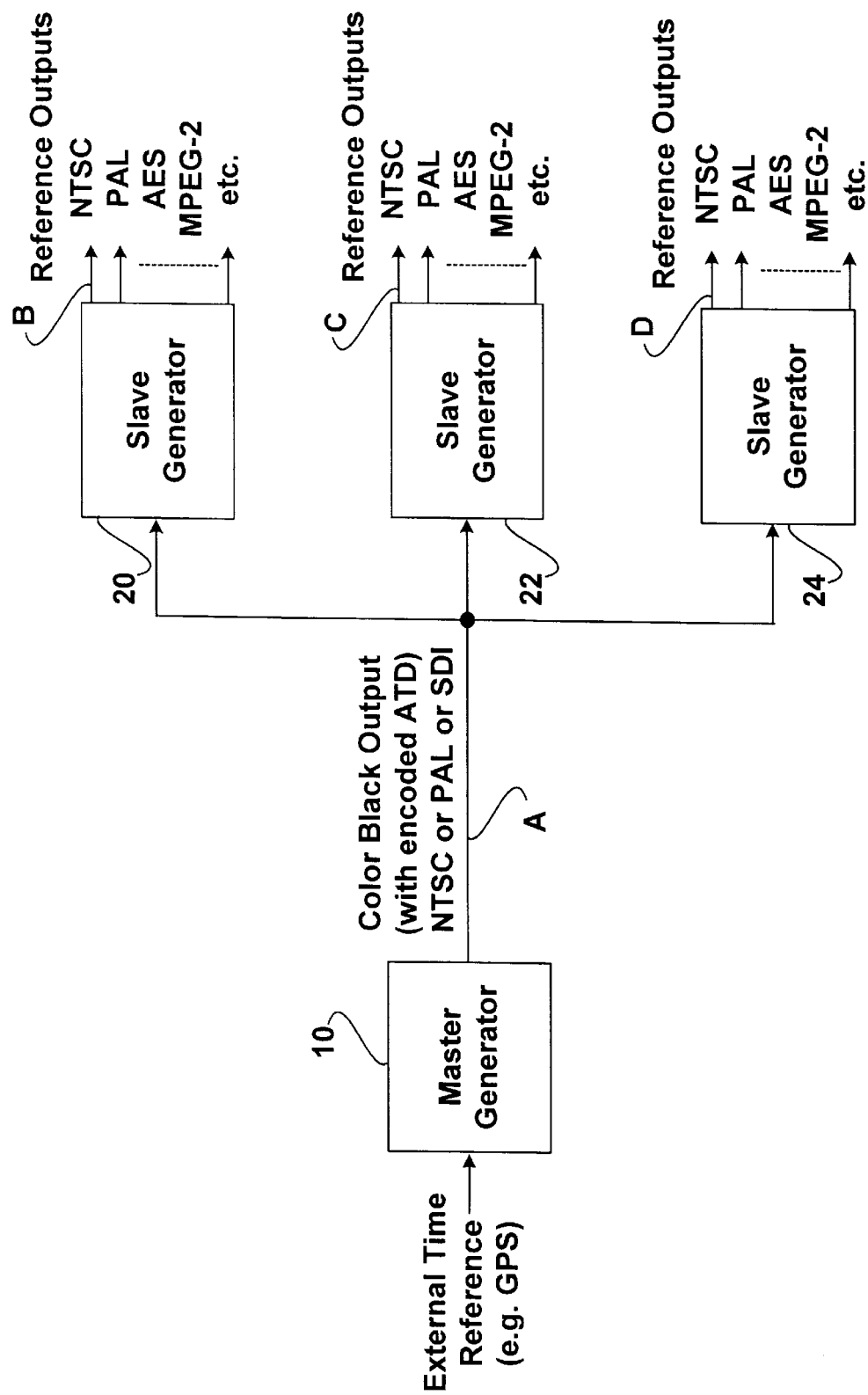
FIG. 1 is a block diagram showing a preferred embodiment of an apparatus for aligning reference signals.
Figure 2:
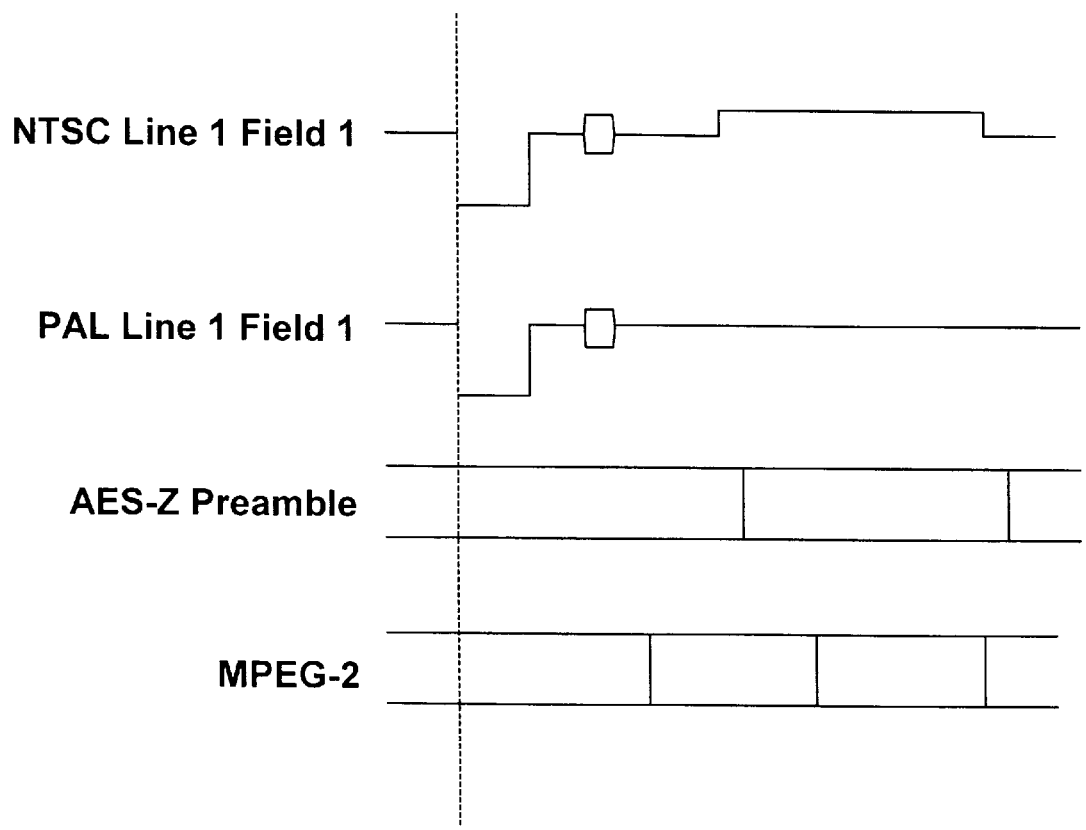
FIG. 2 is a timing diagram showing aligned information signals in NTSC, PAL, AES and MPEG-2 formats.

FIG. 1 illustrates an apparatus according to the invention for encoding, by way of example, reference signals respectively associated with an NTSC video signal originating from a remote broadcasting source, its associated AES digital audio signal, and a PAL video signal originating from a separate remote broadcasting source which is at a different location. These signals are to be combined at receiving station, for example a broadcasting or editing facility, which may be at a different location from both video signal sources.

The master generator 10, which may be located at the receiving station, contains a crystal-controlled or other highly stable oscillator which generates a master reference signal A which may be a frequency which is a common multiple of the information signals. The master generator 10 preferably accepts an input from a time source, for example a highly stable computer reference such as an atomic clock or the Global Positioning System (GPS). Alternatively, the master generator 10 can run on its own internal oscillator using last known time information.

The master reference signal A output by the master generator 10 can be in any format, including composite, component, analog, compressed digital or uncompressed digital. Preferably the master generator 10 outputs the reference signal A as colour black, due to its simplicity and constant Average Picture Level (APL) (ie. minimal variations in DC content). The master generator 10 conventionally generates horizontal sync, vertical sync, colour reference, burst flag and blanking pulses and inserts these into the master reference signal A at the correct positions.

According to the invention, the master generator 10 also reads time information from the absolute time input and periodically encodes this information into the master reference signal A as time code data, preferably such that APL is zero using, for example, AMI or another suitable coding scheme. The time code data can be encoded into any available portion of the reference signal A, for example in the case of NTSC or PAL reference signals on any unused line within the vertical blanking interval. The most convenient position for encoding the time code data will depend upon the type of signal being processed; in the case of an SDI reference the time code data can be encoded within the ancillary data spaces.

Figure 5:
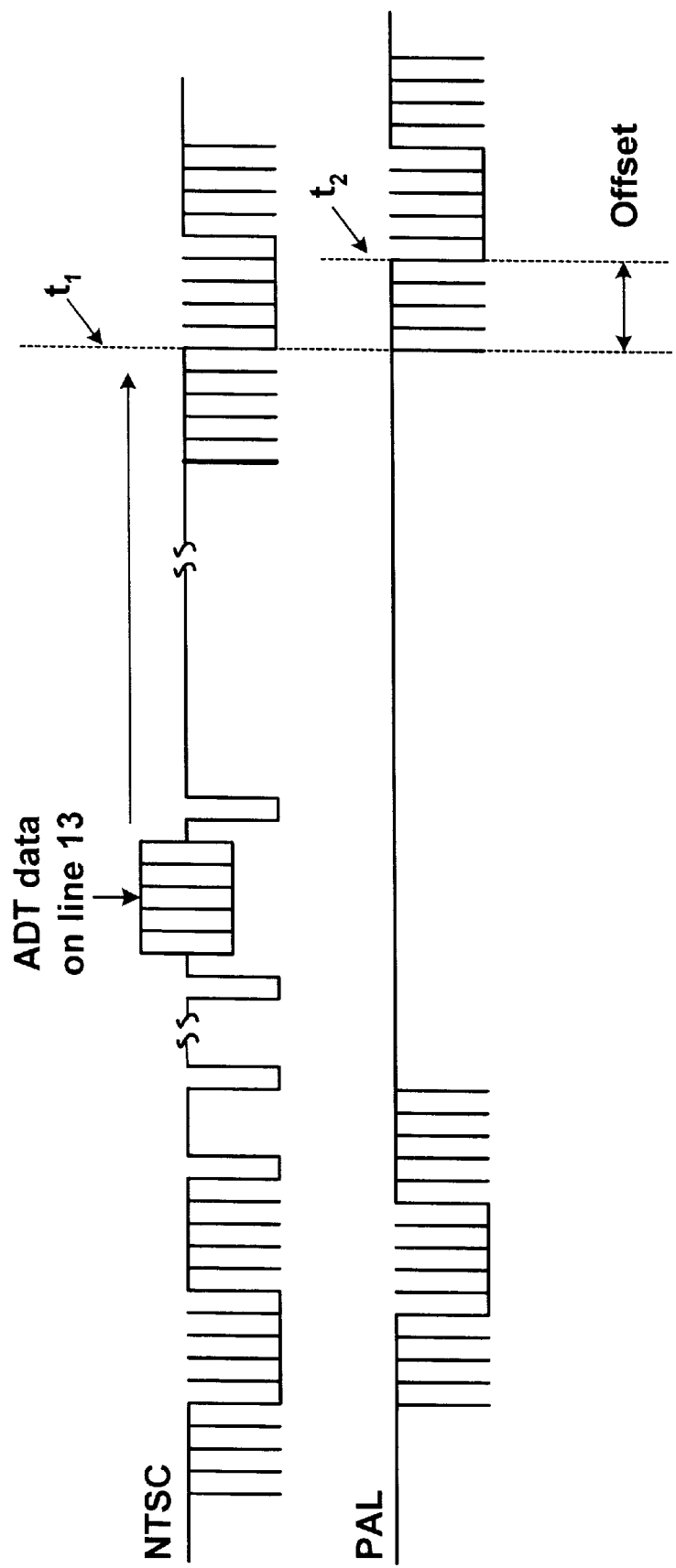
FIG. 5 is a timing diagram showing absolute time data encoded on NTSC and PAL video signals.

To allow for calculation time and phasing of reference signals within slaved generators, the time code data is inserted on a line at the beginning of a field and its value corresponds to the next future synchronizing event, represented in FIG. 5 as the instant t1.

An arbitrary point in time is selected as an initial reference point, and all unrelated timing signals, clock edges and phase relationships are deemed to be in line at the initial reference point. The absolute time code data will be used to calculate the position of each information signal at any later point in time at which the information signals are to be integrated or combined, and thus to calculate the phase offset of each signal relative to the other(s) so that compensating delays can be applied.

Figure 3:
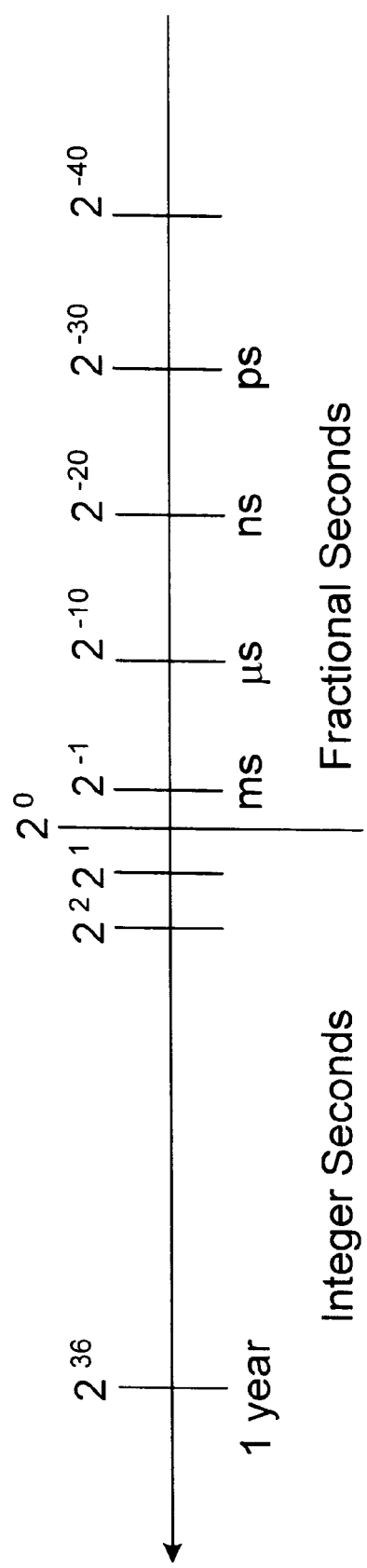
FIG. 3 is a schematic diagram showing the number of bits required to encode whole and fractional seconds for up to one year to picosecond accuracy.

As illustrated in FIG. 3, 10 bits are required to calculate fractional seconds to a resolution of milliseconds, while 40 bits are required to calculate fractional seconds to a resolution of picoseconds; 25 bits are required to count seconds elapsed up to one year and extending this to 128 years would require 32 bits. The output of the counter represents whole seconds and fractional seconds elapsed between the initial reference point and the point at which the synchronizing event occurs.

The master reference signal A output by the master generator 10 forms an external clock reference for conventional slaved sync generators 20, 22, 24 respectively associated with each of the information signals. The slave generators 20, 22, 24 each output a reference signal B, C, D in the format (ie. at the frequency of) its associated information signal with sync, burst flag etc. information aligned with that in the master reference signal A.

The information signals are respectively locked to the slave reference signals B, C, D. The slave generators 20, 22, 24 each include calculating software that, each time a synchronizing event occurs between an information signal and its associated reference signal, determines the number of whole and partial cycles of the signal which have been generated between the initial time point and the synchronizing event. Since synchronizing events based on differences in frequency between the information signal and its associated reference signal are periodic, this information can be predicted in advance and encoded into the slave reference output B, C or D in the frame preceding the synchronizing event.

The receiving station receives the information signals at slightly different times. A decoder decodes the time code data encoded into each reference signal, and responsive thereto a delay device such as a frame store, audio delay etc. delays the information signal as necessary to align the signals, as illustrated in FIG. 5.

The unrelated reference signals B, C, D, each encoded with absolute time code data as indicated above, can also be content-aligned by matching the time code data in each signal. Since the information signals were processed in sync with their respective reference signals B, C, D, the information signals can be perfectly content-aligned irrespective of the locations of the signal sources and any delay resulting from the signal path to the receiving station.

Figure 4:
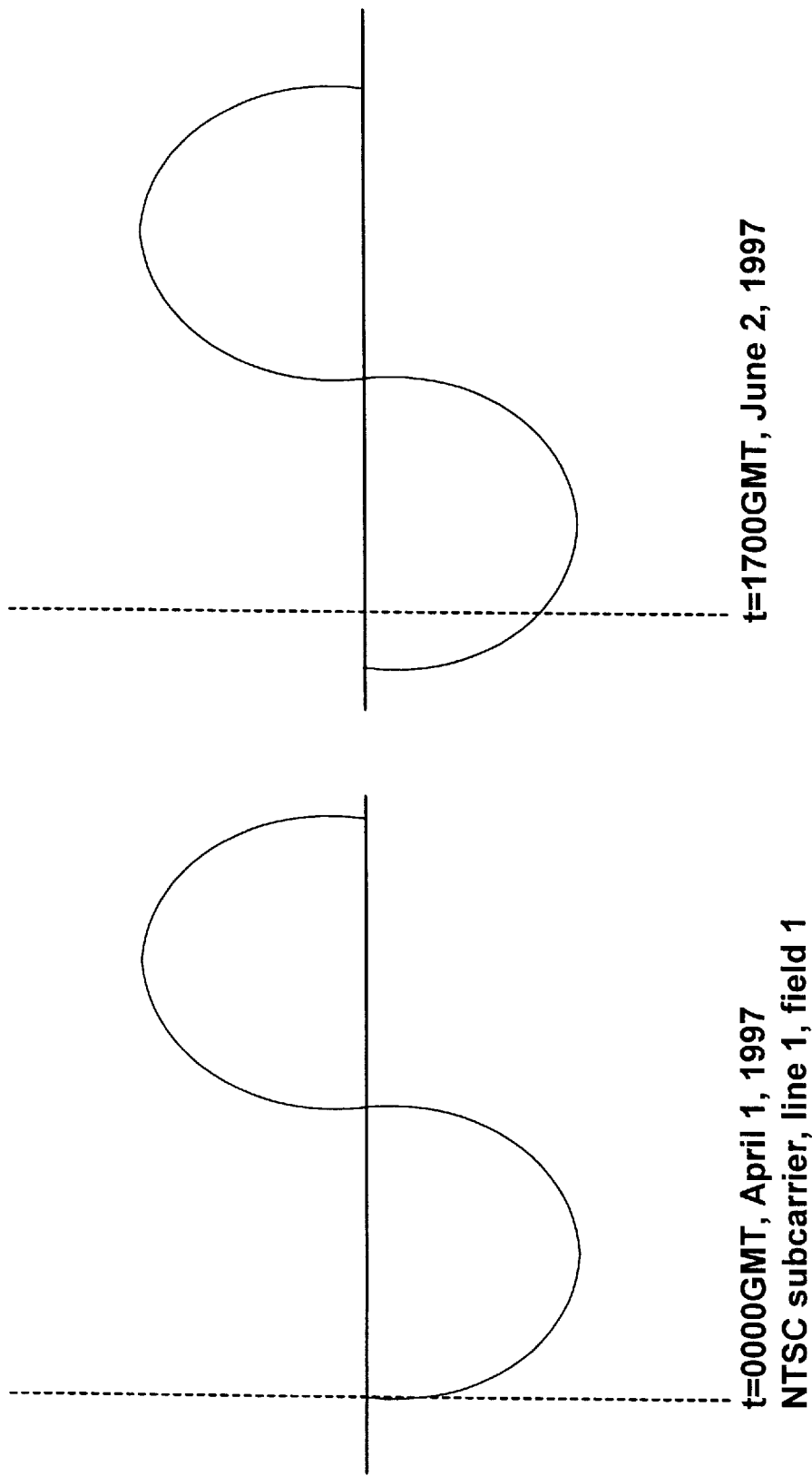
FIG. 4 is a timing diagram showing the phase offset of a signal as calculated according to the method of the invention.

For example, FIG. 4 illustrates the relative phase offset of an NTSC subcarrier as calculated according to the method of the invention. An arbitrary initial time point of 00:00 hours GMT on Apr. 1, 1997 is selected, and the relative position of the signal is determined as at 17:00 hours on Jun. 2, 1997. Since the frequency (or period) of the signal is known, the number of cycles and partial cycles that were generated between the initial time point and the later time point can be calculated using the number of seconds and fractional seconds between these two time points multiplied by by the frequency (or divided by the period) of the signal.

The total number of picoseconds which have elapsed since the initial time point is $5.4468 \times 10^{18}$ ps. Dividing this by the period of the subcarrier, which is 279365.0758 ps, provides the number of cycles and any fraction of a cycle generated since the initial time point. The relative phase offset between the signal at the initial time point and the later time point is indicated by the fractional cycle value, as illustrated in FIG. 4.

In the same fashion, a slaved sync generator can continuously calculate the relative timing of NTSC and PAL vertical sync pulses, as shown in FIG. 5. An NTSC vertical sync pulse at instant t1 is defined by a unique time code value, and the offset (t2−t1) of the PAL vertical sync pulse can be precisely determined using the above calculation methodology.

A preferred embodiment of the invention having been thus described by way of example only, it will be apparent to those skilled in the art that certain modifications and adaptations may be made without departing from the scope of the invention, as set out in the appended claims.

REFERENCES

ANSI/SMPTE 170M-1994, Television Composite Analog Video Signal NTSC for Studio Applications ANSI S.40-1992, Digital Audio Engineering - Serial Transmission Format for Two-Channel Linearly Represented Digital Audio Data ANSI/SMPTE 125M-1992, Television—Component Video Signal 4:2:2—Bit-Parallel Digital Interface ANSI/SMPTE 12M-1992, Television—Time and Control Code—Video and Audio Tape for 525-Line/60 Field Systems ITU-R Recommendation BT.470-4 Television Systems SMPTE 244M-1995, Television—System M/NTSC Composite Video Signals—Bit-Parallel Digital lnterfaoe SMPTE 259M-1993 for Television—10-Bit 4:2:2 Component and 4fsc NTSC Composite Digital Signals—Serial Digital Interface SMPTE RP164-1992, Recommended Practice for Location of Vertical Interval Time Code SMPTE RP154-1994 Reference Signals for the Synchronization of 525-Line Video Equipment.

EBU Specification N14, Specification of a reference signal for the synchronization of 625 line component digital equipment.

ISO/IEC International Standard 13818 parts 1—3 (MPEG-2 standard).

ANSI/SMPTE 240M-1995, Television—Signal Parameters—1125-Line High-Definition Production Systems.

ANSI/SMPTE 292M-1996, Television—Bit-Serial Digital Interface for High-Definition Television Systems.

ITU-R BT.709.2, Parameter Values for the HDTV Standard for Production and International Programme Exchange.

I claim:

1. A method of synchronizing a plurality of periodic signals in time, comprising the steps of
   (a) defining an arbitrary point in time at which said signals are assumed to be exactly synchronized,
   (b) implementing a counter to generate time code data representing time elapsed from said arbitrary point in time,
   (c) encoding time code data, comprising the instantaneous value of said counter corresponding to the next defined synchronizing event into each one of said signals,
   (d) calculating a delay constant for a first one of said signals at a later point in time by comparing the value of the time code data encoded in said first one of said signals to time code data encoded in a second one of said signals,
   (e) delaying said first one of said signals by said delay constant calculated in stop (d).

2. The method of claim 1 wherein in step (c) the time code data is encoded within a frame mediately preceding the next defined synchronizing event.

3. An apparatus for synchronizing one or more unrelated reference signals in time, comprising
   a master sync generator adapted to accept an absolute time reference as an input, compring a counter for counting elapsed time fron an initial time point and encoding a value representing said elapsed time into a master reference signal output by the master sync generator, and
   at least one slave sync generator comprising
      an input connected to said master reference signal,
      a decoder connected to said input to decode time code data encoded in said master reference signal,
      a counter connected to said decoder and synchronized to said time code data,
      a generator for generating a slave reference signal comprising time code data comprising the instantaneous value of said counter at the next defined synchronizing event for said slave reference signal, and
      an output connected to said generator.

4. The apparatus of claim 3 wherein the value representing said elapsed time encoded into the master reference signal represents a calculation of elapsed time to the next defined synchronizing event.

5. The apparatus of claim 4 wherein the value representing said elapsed time is encoded into the master reference signal within a frame immediately preceding the next defined synchronizing event.

6. A system for synchronizing one or more signals, comprising
   (a) a master sync generator comprising
      an input connected to an absolute time reference source,
      a counter connected to said input and synchronized to said absolute time reference source,
      a generator for generating a refernnce signal,
      an encoder connected to said counter and said generator to encode time code data comprising the instantaneous value of said counter corresponding to the next defined synchronizing event into said reference signal to create a master reference signal, and
      an output connected to said generator to output said master reference signal, said master sync generator being adapted to generate an output signal in which said time code data is encoded, and
   (b) a slave synchronizing generator for receiving said master reference signal from said master sync generator, comprising software for decoding the encoded time code data to synchronize said one or more unrelated timing signals.

7. The system of claim 6 wherein the time code data is encoded within a frame immediately preceding the next defined synchronizing event.

* * * * *